US012450332B2

(12) United States Patent
Kaplan et al.

(10) Patent No.: US 12,450,332 B2
(45) Date of Patent: Oct. 21, 2025

(54) SCALED TRUSTED EXECUTION ENVIRONMENT FOR APPLICATION SERVICES

(71) Applicant: Ava Labs, Inc., New York, NY (US)

(72) Inventors: Michael Kaplan, New York, NY (US); Bernard Wong, Waterloo (CA); Nicholas John Mussallem, San Rafael, CA (US); Stephen John Buttolph, Brooklyn, NY (US); Patrick Robert O'Grady, Palo Alto, CA (US); Kevin Sekniqi, Sunny Isles Beach, FL (US); Ted Yin, Mountain View, CA (US)

(73) Assignee: Ava Labs, Inc., New York, NY (US)

(*) Notice: Subject to any disclaimer, the term of this patent is extended or adjusted under 35 U.S.C. 154(b) by 0 days.

(21) Appl. No.: 18/236,352

(22) Filed: Aug. 21, 2023

(65) Prior Publication Data
US 2024/0086520 A1 Mar. 14, 2024

Related U.S. Application Data

(60) Provisional application No. 63/405,325, filed on Sep. 9, 2022.

(51) Int. Cl.
*G06F 21/53* (2013.01)
*H04L 67/1012* (2022.01)

(52) U.S. Cl.
CPC .......... *G06F 21/53* (2013.01); *H04L 67/1012* (2013.01)

(58) Field of Classification Search
None
See application file for complete search history.

(56) References Cited

U.S. PATENT DOCUMENTS 9,294,408 B1    3/2016 Dickinson et al.
10,979,461 B1*  4/2021 Cervantez ............. H04L 63/105
                       (Continued)

FOREIGN PATENT DOCUMENTS

WO    2020/047116 A1    3/2020

OTHER PUBLICATIONS

USPTO—International Search Report with Written Opinion mailed on Dec. 14, 2023 for related International Application No. PCT/US2023/072567; 16 pgs.

(Continued)

*Primary Examiner* — Joshua Joo
(74) *Attorney, Agent, or Firm* — McDermott Will & Schulte LLP

(57) ABSTRACT

Various aspects of the subject technology relate to systems, methods, and machine-readable media for providing an application trusted execution environment. Various aspects may include performing attestation of each application enclave of a plurality of application enclaves for a plurality of applications. Aspects may also include receiving a request from a client. Aspects may also include selecting a load balancer to forward the request to the application enclaves. Aspects may also include determining a sensitivity level of the request that is associated with a secured environment parameter. Aspects may include routing, by an enclave server of the load balancer, the request to an application enclave according to the sensitivity level for execution of an application of the plurality of applications in the application trusted execution environment.

20 Claims, 8 Drawing Sheets

(56) References Cited

U.S. PATENT DOCUMENTS

| | | |
|---|---|---|
| 2014/0096182 A1 | 4/2014 | Smith |
| 2017/0124335 A1* | 5/2017 | Freudiger ............ G06F 21/6254 |
| 2017/0180394 A1 | 6/2017 | Crofton et al. |
| 2018/0145969 A1* | 5/2018 | Agrawal ................ H04L 63/105 |
| 2018/0167203 A1 | 6/2018 | Belenko |
| 2020/0058071 A1* | 2/2020 | Yang ....................... G06Q 20/10 |
| 2020/0089872 A1* | 3/2020 | Gray ..................... H04L 9/0861 |
| 2020/0099703 A1* | 3/2020 | Singh ................. H04L 63/1408 |
| 2020/0142788 A1 | 5/2020 | Hu et al. |
| 2020/0169584 A1 | 5/2020 | Penner et al. |
| 2020/0296128 A1* | 9/2020 | Wentz ................. H04L 63/1433 |
| 2020/0349271 A1 | 11/2020 | Binkley et al. |
| 2021/0240459 A1* | 8/2021 | Ranjan .................. G06F 9/5055 |
| 2021/0271763 A1 | 9/2021 | Perlman et al. |
| 2022/0067150 A1* | 3/2022 | Karame .................. G06F 21/53 |
| 2022/0198563 A1 | 6/2022 | Kaplan et al. |
| 2022/0286346 A1* | 9/2022 | Evans ................. H04L 63/0281 |
| 2022/0377135 A1* | 11/2022 | Boshev ............... H04L 67/1001 |
| 2023/0246813 A1* | 8/2023 | Tsirkin .................. H04L 9/0631 |
| | | 713/168 |
| 2023/0385120 A1* | 11/2023 | Voit ....................... G06F 9/5055 |
| 2024/0411842 A1* | 12/2024 | Kashyap ............. H04L 63/0823 |
| 2024/0411938 A1* | 12/2024 | Emerson ............... G06F 21/575 |

OTHER PUBLICATIONS

Bean, J.D., Encryption-in-transit for public sector workloads with AWS Nitro Enclaves and AWS Certificate Manager. AWS Public Sector Blog, Mar. 1, 2021, 7 pages. Retrieved on Nov. 1, 2023 from <https://aws.amazon.com/blogs/publicsector/encryption-in-transit-public-sector-workloads-aws-nitro-enclaves-aws-certificate-manager/>.

Shukla, J., Using sensitivity labels with SharePoint document libraries. Gravity Union, Jul. 12, 2022, 14 pages. Retrieved on Nov. 1, 2023 from <https://www.gravityunion.com/blog/2022/7/sensitivity-labels-sharepoint#:~: text=When%20you%20enable%20a%20sensitivity,view%20the%20document%2C%20or%20encryption.>.

* cited by examiner

SCALED TRUSTED EXECUTION ENVIRONMENT FOR APPLICATION SERVICES

CROSS-REFERENCE TO RELATED APPLICATIONS

The present disclosure is related and claims priority, under 35 U.S.C. § 119(e), to U.S. Prov. Pat. Appln. No. 63/405,325, entitled SCALED TRUSTED EXECUTION ENVIRONMENT FOR APPLICATION SERVICES, to Michael KAPLAN et al., on Sep. 9, 2022, the contents of which are hereby incorporated by reference in their entirety, for all purposes.

TECHNICAL FIELD

The present disclosure generally relates to trusted execution environments implemented for web services such as microservices, and more particularly to scaled trusted execution environments for web services (e.g., Internet based microservices).

BACKGROUND

Current trusted execution environments involve isolating or separating computer memory (e.g., enclaves) to protect sensitive or confidential application data. For example, the source or production code of an application can be executed in a trusted portion of the computer memory such as a special encrypted memory region with restricted entry and exit. In this way, security guarantees or assurances can be provided for such code or applications executed in enclaves, which can include protecting private user information, ensuring correct execution of source code, and increasing privacy and security for services such as transaction processing, consensus, smart contracts, and key storage. However, an enclave-based execution of microservices may lead to bottlenecks and delays when network traffic through a specific node is in high demand. Furthermore, the ad-hoc nature of handling different microservices in a compartmentalized fashion hinders leveraging and scaling of network capabilities (e.g., incorporating new services, domains, and user segments). In many instances, execution of trusted-base applications is typically limited to the throughput of a single machine, limiting the feasible applications that can be built.

SUMMARY

According to one embodiment, a computer-implemented method for providing an application trusted execution environment is provided. The method includes performing attestation of each application enclave of a plurality of application enclaves for a plurality of applications. The method also includes receiving a request from a client. The method also includes selecting a load balancer of a plurality of load balancers to forward the request to the plurality of application enclaves. The method also includes determining a sensitivity level of the request that is associated with a secured environment parameter. The method also includes routing, by an enclave server of the load balancer, the request from the load balancer to an application enclave of the plurality of application enclaves according to the sensitivity level for execution of an application of the plurality of applications in the application trusted execution environment.

According to one embodiment, a system is provided including a processor and a memory comprising instructions stored thereon, which when executed by the processor, causes the processor to perform a method for providing an application trusted execution environment. The method includes performing attestation of each application enclave of a plurality of application enclaves for a plurality of applications. The method also includes receiving a request from a client. The method also includes selecting a load balancer of a plurality of load balancers to forward the request to the plurality of application enclaves. The method also includes determining a sensitivity level of the request that is associated with a secured environment parameter. The method also includes routing, by an enclave server of the load balancer, the request from the load balancer to an application enclave of the plurality of application enclaves according to the sensitivity level for execution of an application of the plurality of applications in the application trusted execution environment.

According to one embodiment, a non-transitory computer-readable storage medium is provided including instructions (e.g., stored sequences of instructions) that, when executed by a processor, cause the processor to perform a method for providing an application trusted execution environment. The method includes performing attestation of each application enclave of a plurality of application enclaves for a plurality of applications. The method also includes receiving a request from a client. The method also includes selecting a load balancer of a plurality of load balancers to forward the request to the plurality of application enclaves. The method also includes determining a sensitivity level of the request that is associated with a secured environment parameter. The method also includes routing, by an enclave server of the load balancer, the request from the load balancer to an application enclave of the plurality of application enclaves according to the sensitivity level for execution of an application of the plurality of applications in the application trusted execution environment.

According to one embodiment, a non-transitory computer-readable storage medium is provided including instructions (e.g., stored sequences of instructions) that, when executed by a processor, cause the processor to perform a method for providing an application trusted execution environment. The method includes performing attestation of each application enclave of a plurality of application enclaves for a plurality of applications. The method also includes receiving a request from a client. The method also includes selecting a load balancer of a plurality of load balancers to forward the request to the plurality of application enclaves. The method also includes determining a sensitivity level of the request that is associated with a secured environment parameter. The method also includes encrypting, based on the sensitivity level and prior to sending the request to at least one of the plurality of application enclaves, information associated with the request via an encryption mechanism shared with the at least one of the plurality of application enclaves. The method also includes selecting an application enclave of the plurality of application enclaves based on the sensitivity level or the application. The method also includes routing, by an enclave server of the load balancer, the request from the load balancer to an application enclave of the plurality of application enclaves according to the sensitivity level for execution of an application of the plurality of applications in the application trusted execution environment. The method also includes validating a response from the application enclave as authentic prior to returning the response to the client.

In yet another embodiment, a computer-implemented method includes receiving in a network server from a client device with a user, a request to perform a service for an application running in the client device, identifying a sensitivity level in the request, based on a desired accessibility to a request information, determining a degree of encryption for transmitting the request to a first dedicated server hosting the application running in the client device, and routing the request to the first dedicated server, for processing.

These and other embodiments will become clear to one of ordinary skill in the art, in view of the following.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
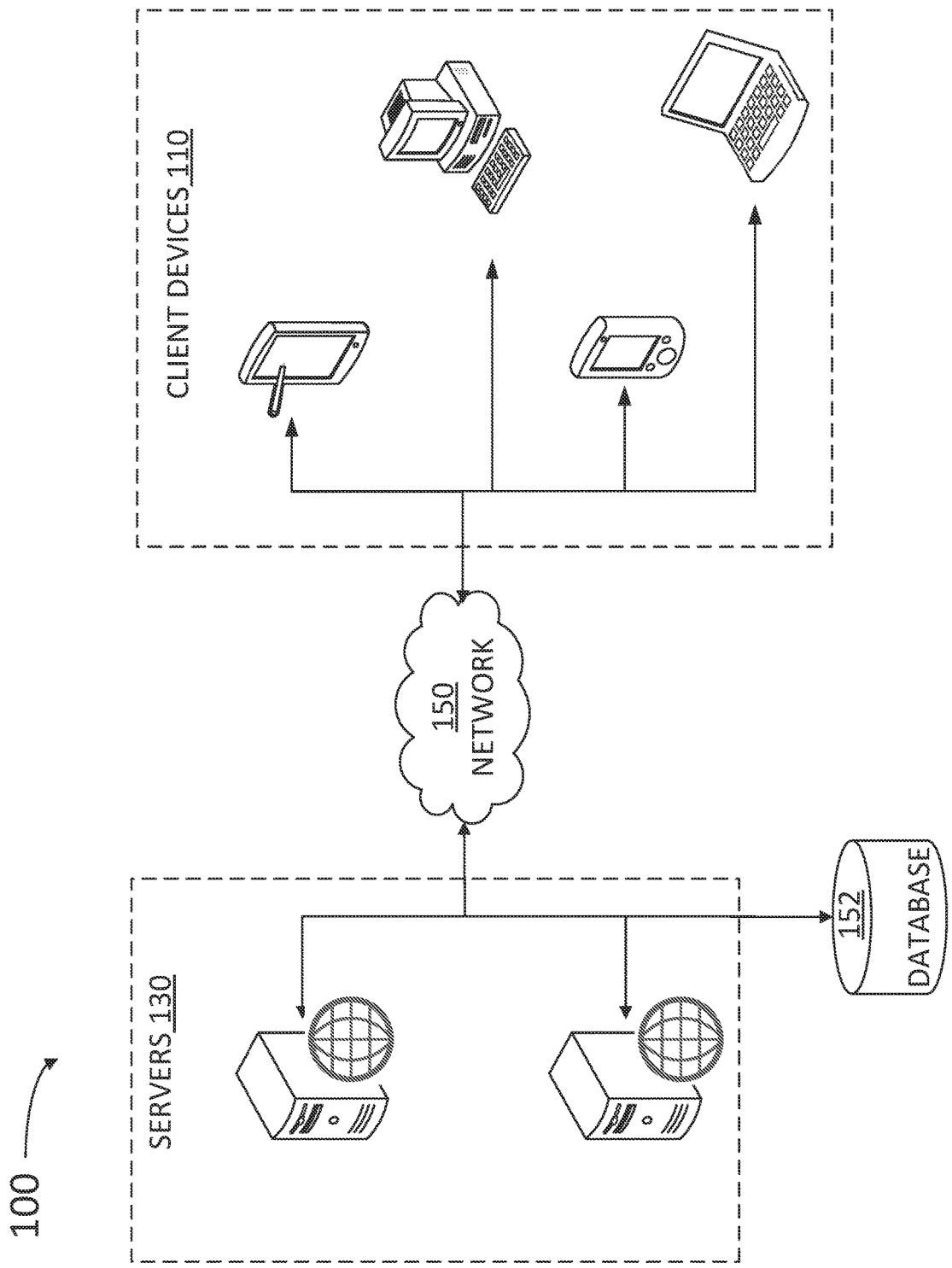
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure. In the figures, components having the same or similar attributes are assigned the same or similar reference numbers, unless explicitly stated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the included clauses. Various aspects of the subject technology will now be disclosed according to particular but non-limiting examples. Various embodiments described in the present disclosure may be carried out in different ways and variations, and in accordance with a desired application or implementation.

General Overview

Trusted execution environments provide strong security, confidentiality, and tamper-proof guarantees of applications run within enclaves. These solutions can be used to protect private user information, ensure correct execution of source code, and the like. However, there is a lack of networking solution for building web services that leverage trusted execution environments. Current microservices patterns of scaling web2 services lacks the desired security/confidentiality properties of trusted-execution web services. Without a horizontal scaling solution, transactions-per-second (TPS) of trusted-execution-based applications is limited to the throughput of a single machine, limiting the feasible applications that can be built.

To resolve the above problems arising in the technical arena of network-based computer applications, embodiments disclosed herein include a computer networking architecture for building web services that leverage and scale trusted execution environments. In particular, web services (e.g., web2, web3, etc.) may be horizontally scaled so that applications being built can be expanded beyond the throughput of a single computational machine.

The subject disclosure provides for systems and methods for providing an application trusted execution environment. The application trusted execution environment involves a horizontally scaled architecture that functions as a trusted-enclave-based web service for Internet service distributed systems. For example, the disclosed environment may incorporate the use of an isolated microservice architecture pattern such that clients of the application trusted execution environment benefit from security, confidentiality, and tamper-proof guarantees/assurances in a scaled application enclave model. The scaled application trusted execution environment of the subject disclosure may have an increased quantity of throughput available compared to non-scaled environments to address a significant quantity of client requests via scaling secure application enclaves for Internet services. As an example, the disclosed scaled application trusted execution environment may be used to enhance the security and confidentiality of services (e.g., microservices) or applications being executed in the context of an implemented blockchain based exchange, cryptocurrency exchange, and the like. The subject disclosure may also provide a load balancer and secured enclave architecture for ensuring the security of application programming interface (API) requests from clients of the scaled environment, which advantageously improves security as well as enables the use of varying levels of encryption, depending on the respective nature/characteristics of the API requests.

The subject disclosure provides a technical solution to a problem arising in the computer networks and/or encryption. Advantageously, the subject disclosure enables an improved trusted execution environment architecture that scales throughput for handling a sufficient quantity of requests in a scaled memory encryption-based web application with a public facing API layer to process requests. The scaled environment may address attestation, load balancing, along with handling client requests. Also, the architecture of the subject disclosure may provide sufficient security and confidentiality guarantees. Advantageously, the provided technical solution also enables the routing/networking layer of the architecture to be optimally scalable and capable of offloading the processing cost of handling client connections (e.g., including encryption and/or other cryptographic protocol) from application servers. Such offloading can address limitations regarding the scalability of the application servers, such as due to sequential execution requirements of application logic. As an example, the scaled secure enclave architecture may include execution of security-related instruction codes. As an example, the subject disclosure enables implementation of a trustless exchange in which the operator of the exchange advantageously does not gain access to keys (e.g., public-private key pair) associated with cryptocurrency held by an entity requesting services via the public facing API layer.

As such, execution of the cryptocurrency-based or other requested web services can be handled and executed in secured enclaves based on a sensitivity level corresponding to the requested services. For example, execution of cryptocurrency-based operations can be executed without disclosing confidential/sensitive information indicated in requests sent to the exchange via the API layer. In particular, decrypted sensitive information may be visible only to a selected application enclave (e.g., routed by load balancer(s)) specifically for processing a particular request, which advantageously improves the security and effectiveness of the scaled memory encryption-based web application. The load balancer(s) can beneficially facilitate scaling (e.g., horizontal scaling) of the web application for combining the isolated microservice architecture pattern use for the requested services (e.g., web2 services) and trusted execution environment-based services. Within the web application, the load balancer(s) may function as a thin layer (e.g., stateless application) to handle any clustered request sequence or other clustering of public requests to route the requests to a corresponding backend application enclave. The load balancer(s) can be or include any suitable type of load balancing mechanism such as a load balancer application functioning as a pass-through load balancer at a fixed Internet Protocol (IP) address (e.g., passing through requests to routing/networking enclaves), load balancer enclaves at IP addresses indicated by a Domain Name System (DNS) record.

The disclosed system addresses a problem in computer networks and computer encryption technology, namely, the technical problem of scaling memory-based encryption environments for web services (e.g., computer/Internet applications for microservices and providing sensitivity and confidentiality for various types of public requests for the web services). The disclosed system solves this technical problem by a plurality of load balancers that are selected by clients of the web services such that each load balancer routes a request to the attested backend application enclaves to address the load on the enclaves as well as the sensitivity level (e.g., confidentiality) of each request or type of application that the services are used for. The disclosed system can represent an enclave based trusted execution environment for Internet based services including a public web API that can require authentication via Secure Sockets Layer (SSL) client certificates.

Alternatively, the load balancers can be or include one or more pass-through load balancers that can pass-through requests to routing and/or networking enclaves, such as in a round robin fashion. In such a configuration, it may be unnecessary for the pass-through load balancer to operate in a secure enclave because such load balancers do not terminate the transport layer security (TLS) connections of the clients. As such, the pass-through load balancer would be unable to access confidential information and could function as an entry point to forward the client requests/connections to the routing enclaves in a rate limiting manner so that no single routing enclave instance becomes overburdened by a particular client using the same IP address. Advantageously, the routing and networking enclaves (or layer generally) are horizontally scalable such that they may offload operations for handling client connections handled by application servers. This may improve the overall throughput and scalability of the architecture because such application servers may be limited by sequential execution requirements.

Regardless of which of multiple suitable load balancer mechanisms is implemented, the encrypted link established via SSL between the server(s) providing the services may be terminated within a selected one of the application enclaves so that other actors including an operator of the physical machine that the application enclave is located on, may not be able to decrypt the request for service(s). Because encrypted requests are only decrypted to the application enclave processing the encrypted requests (e.g., rather than being decrypted by a load balancer which may undesirably expose otherwise encrypted information to other actors/components such as internal micro services behind the load balancer), the security of providing the web services may be improved. As an example, the disclosed system may address problems associated in front running, such as when other actors are able to access otherwise confidential order information submitted by a requesting user to a cryptocurrency exchange such as to buy or sell in front of the requesting user.

As such, by horizontally scaling trusted execution environments, the disclosed system provides "best" order execution, without revealing cryptographic keys associated with cryptocurrency or order information indicated by a request for a cryptocurrency transaction until the requested transaction is executed. More generally, the disclosed system provides scaled trusted execution environments that advantageously address public requests to the API layer for services that require or correspond to varying levels of encryption. The varying levels of encryption may refer to changing an extent of encryption depending on different levels of confidentiality (e.g., sensitivity levels) for different requests made to the public API layer. The disclosed scaled trusted execution environments also may provide attestation, load balancing, and handling requests received from clients for various web services applications in an encrypted and confidential manner such that the limitations of application servers do not impede the scaled trusted execution environments from handling significant quantities of client requests.

Load balancers may route requests, such as via enclave servers, to selected application enclaves, such as based on the varying confidentiality or sensitivity levels. Load balancers may alternatively merely pass through client requests to a routing networking layer that parses and routes requests to application enclaves with encryption. In such a scenario, remote attestation may be applied so that applications may establish trust with each other if one or both applications are executing within secure enclaves. If such trust can be established, the client TLS connection can be terminated within the routing/networking layer (e.g., routing/networking enclaves) rather than at the application enclave layer. In this way, the disclosed system beneficially may ensure that confidential information of a given public request to the API layer is visible only to a selected or targeted application enclave that is handling the given request.

Example System Architecture

FIG. 1 is a block diagram of a device operating environment with which aspects of the present disclosure can be implemented. FIG. 1 illustrates an exemplary network architecture 100 to provide a trusted execution environment platform such as a trusted-enclave-based web service for providing an application trusted execution environment, according to some embodiments. The network architecture of FIG. 1 includes one or more client devices 110 and one or more servers 130 which are communicatively coupled through the network 150. The servers 130 provide services such as Internet based services including web2 services and web3 services, for example, to the client devices 110 in the application trusted execution environment. As such, the server 130 may implement a computer application for a scaled trusted execution environment that provides various services, such as cryptocurrency-based services, transaction services, payment services, look up services, data services, query services, and/or the like. A database 152 may store relevant information and data structures for the trusted-enclave-based web service. The servers 130 may include an enclave server, a plurality of load balancers (or a single-pass-through load balancer connected to a plurality of routing/networking enclaves as described herein), and a plurality of application enclaves configured for memory based encrypted execution of computer code (e.g., for implementing the trusted execution environment).

The trusted execution environment platform may advantageously enable the servers 130 to provide requested services or microservices to the client devices 110 in a secure, confidential, and decentralized manner. The secure and confidential processing of public requests by the client devices 110 can be enabled by routing to application enclaves according to the sensitivity levels of the public requests in which encrypted or sensitive information of the public requests are only decrypted or visible to the particular application enclave that is processing the request. A DNS record for the servers 130 may name a set of load balancers such as the plurality of load balancers or a subset thereof. Subsequently, the client devices 110 may each select at random a given load balancer of the set of load balancers, which advantageously can maintain a roughly even distribution of load across the load balancer. Each selected load balancer may route requests (e.g., corresponding requests via the enclave server) from the client devices 110 to the plurality of application enclaves, such as routing a given request to a given attested backend application enclave. Each selected load balancer may also route requests to a plurality of backend server components of the one or more servers 130, which may or may not contain the application enclaves.

As an example, data read requests can be routed to a set of the servers/application enclaves while more computationally expensive requests (e.g., order execution requests) can be routed to another set of the application enclaves. Alternatively, the set of load balancers may be replaced with a single (or more than one) pass through load balancer. The pass-through load balancer may be located at a fixed IP address to provide rate limiting (e.g., so clients do not spam a single routing enclave instance) and routing of requests from the client devices 110 in a round robin manner. Because the pass-through load balancer does not terminate the TLS connection of the client devices 110, it may be unnecessary for the pass-through load balancer to operate in a secure enclave. Rather, the termination of the TLS connection can be offloaded to an enclaved routing/networking layer. In this way, the aggregate load may be reduced and the load may be scaled better for the scaled trusted execution environment, which can be horizontally scaled for a plurality of different suitable load balancing mechanism implementations that operate in front of or in combination with the routing enclave layer.

The network 150 may include a wired network (e.g., via fiber optic or copper wire, telephone lines, and the like) or wireless network (e.g., a cellular network, radio-frequency (RF) network, Wi-Fi, Bluetooth, and the like). The client devices 110 may be any one of a mobile device, a laptop, a desktop, a tablet (e.g., palm or pad) device, a television, a display device, and/or the like. The client devices 110 can be controlled by a user to request services, such as via the mechanisms described herein. For example, the client devices 110 may use API calls to request services for transaction processing, consensus, smart contract, and key storage. Smart contracts may refer to self-executing computer programs, applications, or contracts for executing transactions such as financial transactions involving cryptocurrency. The API calls may involve public requests such as Hypertext Transfer Protocol (HTTP) Internet-based request methods for communicating between the client devices 110 and the servers 130. For example, the public requests can include GET, POST, PUT, HEAD, DELETE, PATCH, OPTIONS, CONNECT, TRACE, and/or the like for requesting the services or microservices provided by the trusted execution environment platform via the servers 130. Multiple client devices 110 may have access to the trusted execution environment platform hosted by the servers 130 via an online or offline connection, such as a wireless connection, wired connection, ad hoc connection, mobile connection, satellite connection, and/or the like. Each of the servers 130 may be a computing device such as part of a cloud computing server including one or more desktop computers or panels mounted on racks, and/or the like. The panels may include processing boards and also switchboards, routers, and other network devices.

Figure 2:
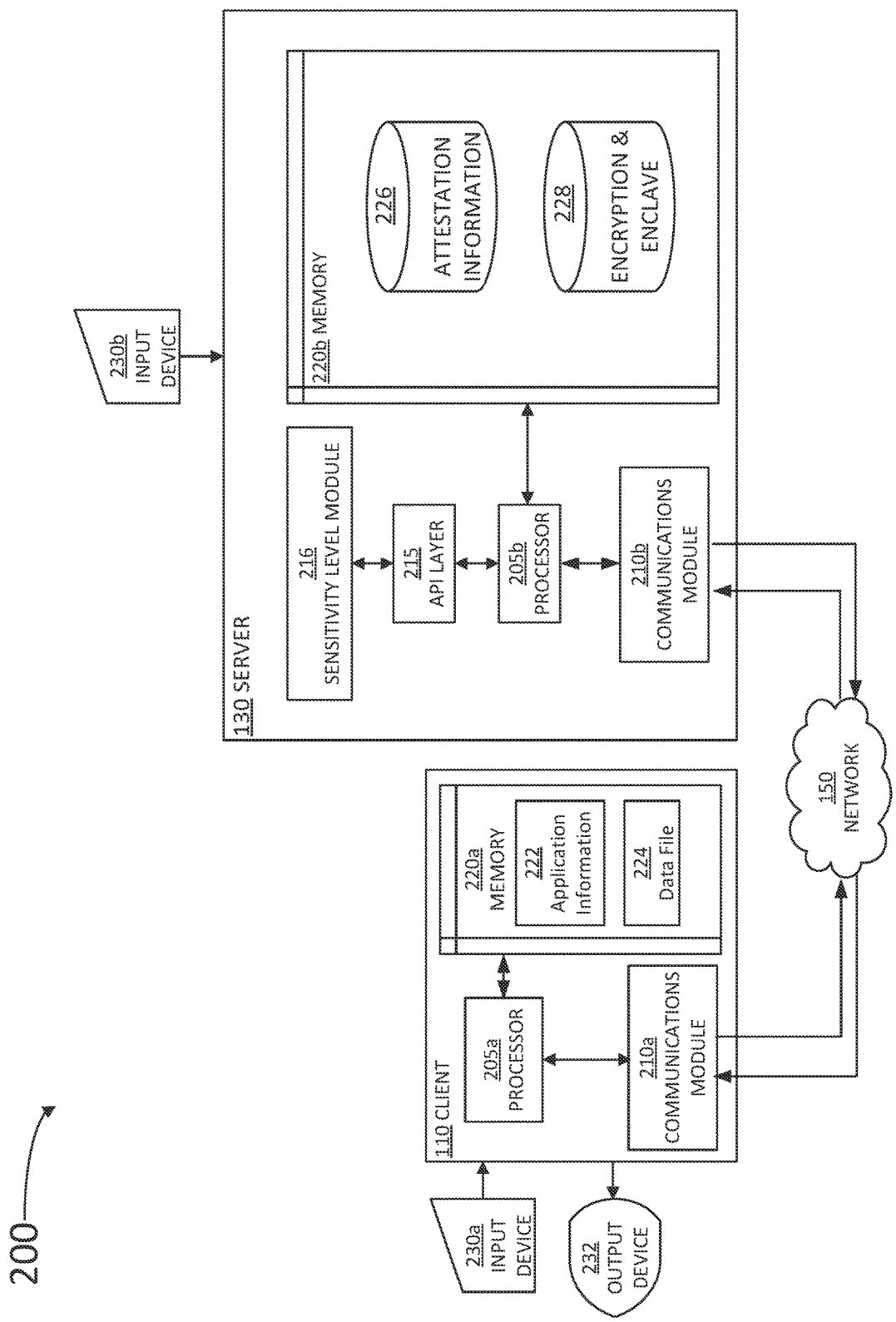
FIG. 2 is a block diagram of an example computing network of a blockchain based platform for providing a scaled trusted execution environment for application information and code security, according to certain aspects of the present disclosure.

FIG. 2 is a block diagram of an example computing network 200 of an example blockchain based platform for providing a scaled trusted execution environment for application information and code security, according to certain aspects of the present disclosure. The computing network 200 may represent a web application for services that are handled in a scaled trusted execution environment. The web application may provide web services to one or more client devices 110 via one or more servers 130. The services may be requested via public requests to an API layer 215, which may be associated with varying levels of confidentiality for different requests. As an example, an API POST request that sends information from the one or more client devices 110 to the one or more servers 130 may be treated differently than an API GET request that requests non-confidential information from the servers 130. The confidential or sensitive information indicated or corresponding to certain API requests may benefit from memory-based encryption via the scaled trusted execution environment so that an operator of the servers 130, the environment, or some other actor involved in the environment cannot access the confidential information. As discussed herein, the memory-based encryption can be based on Intel Software Guard Extensions (SGX), available from Intel Corporation of Santa Clara, California.

In particular, any encrypted or confidential information of the public API requests may not be decrypted or visible to non-authorized actors until an application enclave (e.g., implementing the memory-based encryption) processes or handles the received public API requests. That is, the public requests to API layer 215 may not be visible out of an encryption and/or secured enclave environment. A plurality of load balancers may be provided to manage the traffic or bottlenecks associated with a significant quantity of public requests sent from the one or more client devices 110 via one or more servers 130 for services provided by the web application. The plurality of load balancers may be configured to determine which requests are sent to which of a plurality of backend attested application enclaves. Alternatively, a particular load balancer may pass through the public API requests without terminating TLS such that an enclaved routing layer (e.g., including multiple routing/networking enclaves) can securely terminate the TLS connection as well as parse and route the public API requests to the plurality of backend attested application enclaves.

The attestation of the application enclaves can be performed by the one or more client devices 110 or via the plurality of load balancers. As an example, the one or more client devices 110 can perform remote attestation of the plurality of load balancers and/or their constituent load balancer enclaves. As an example, the load balancer enclaves may perform attestation of the backend application enclaves which can eliminate the need for the one or more client devices 110 to attest the backend application enclaves. The remote attestation can be performed as a mechanism to establish trust between applications (e.g., corresponding to the backend application enclaves) if one or both parties participating in the scaled trusted execution environment or using the web application are running within secure enclaves. In particular, the established may be used to enable secure termination of the TLS connection within the routing or networking layer rather than termination at the plurality of backend attested application enclaves. This architecture may improve the throughput and/or efficiency of the scaled trusted execution environment and/or web application, such as by bypassing the loss in speed or otherwise limitations of sequential execution requirements of application logic corresponding to the plurality of backend attested application enclaves.

The load balancer enclaves can perform attestation by proxy for the one or more client devices 110. The load balancer enclaves can also determine (e.g., one time) a hash (e.g., value, algorithm, etc.) of the requested service(s) or application(s) executing on the backend application enclaves which can ensure the security of routing each request made to the web application with an appropriate level of encryption given the sensitivity/confidentiality level of the corresponding request. Moreover, the plurality of load balancers and the one or more (backend) servers 130 can perform mutual attestation so that the combination of the balancers and servers can perform all functions that the web application is responsible for performing. The plurality of load balancers may account for a varying level of encryption depending on different sensitivity levels of different public requests for computation efficiency such that computing resources are used efficiently. For example, computing processing costs may be reduced because the plurality of load balancers may forward encrypted information to the application enclaves with the encryption necessary for the sensitivity of the request, which can reduce the total computing cost for encryption by applying selective encryption. As such, the one or more client devices 110 may attest the identities of the plurality of load balancers to verify that the services/applications being executed by application enclaves have not been comprised. For example, an attested load balancer can be attested for determination that this load balancer is the intended load balancer that will forward packets (e.g., data packets, API requests, etc.) from a given client device 110 to designated backend application enclave(s) while maintaining confidentiality. Information for performing various attestations as described herein can be stored in the database 226 for attestation information/data.

Each of the one or more client devices 110 and the one or more servers 130 may access each other and other devices in the network 150 via corresponding communications modules 210a-210b. The load balancers may perform front end activities such as user input sanitization for the one or more client devices 110. The communications modules 210a-210b may each include radio hardware and software such as RF antennas, analog circuitry, digital to analog conversion circuits, digital signal processing circuitry, and/or the like. The client device 110 and server 130 depicted in FIGS. 1-2 may each include a processor 205a-205b and memory 220a-220b, respectively. The processor 205a of the client device 110 may be used to operate the client device 110, such as to execute applications and functions thereof rendered on the client device 110 and to send requests to API layer 215 for services such as blockchain operations, functions of runtime applications, cryptocurrency-based transactions, and/or the like. Requests to API layer 215 may include, be composed of, or correspond to application information located in the application 222 and the data file 224. For example, the data stored in the application 222 can be used for a client application and data related to the web application of the trusted application execution environment, such as a client digital wallet for managing and conducting transactions with cryptocurrency. Processor 205b may be used to implement hardware-based encryption, such as isolated or siloed memory-based processing of requests to API layer 215.

For example, processor 205b may implement an application enclave in a portion of computer memory for secure or confidential execution of computer operations, such as to process the API requests. Processor 205b may be in communication with database 228 which contains encryption and enclave information (e.g., including software development kit information) to facilitate secure code execution as well as request and data isolation within application enclaves of the trusted execution environment platform. For example, processor 205b can be in communication with database 228 to generate a cryptographic key for safely storing and retrieving sensitive or confidential information being sent or received externally to a corresponding application enclave. As an example, application enclaves can be located or implemented as a trusted component of memory for the web application, such as a memory of the trusted execution environment platform which could at least partially include memory 220b. Server 130 may be configured for scaling memory-based encryption for execution of code, handling of API requests, and storing sensitive data for the one or more client devices 110 that may send a significant quantity of requests. In this way, the trusted execution environment may use scaled separated memory enclaves to ensure secure and confidential communications between the one or more client devices 110, servers 130, and other actors for secure communications, payments, transactions, etc., related to services (e.g., cryptocurrency and smart contract-based services) provided by the web application. Memories 220a and 220b, and processors 205a and 205b, will be collectively referred to, hereinafter, as "memories 220" and "processors 205."

Generally, client device 110 and the server 130 comprise computing devices including at least: memories 220 storing instructions and processors 205 configured to execute the instructions to perform, at least partially, one or more steps as described in methods disclosed herein. For example, memory 220a of client device 110 may be used to gain access to a browser, service, or application component 222 that is part of the trusted execution environment platform hosted by server 130.

For example, client device 110 makes requests to API layer 215 during execution of application 222. A sensitivity level module 216 in server 130 identifies and determines sensitivity/confidentiality levels for different types of requests to API layer 215 within the trusted execution environment. These sensitivity levels may be integrated in a data file 224 provided to client device 110 and associated with application 222. In some embodiments, sensitivity level module 216 may assign different sensitivity levels to one or more requests within the same application 222.

An input device 230b can be used for the server 130 to define what types of services and requests are supported by application 222 and API layer 215. The sensitivity levels can be defined via user/operator input, such as via an input device 230a. Data file 224 stored in the memory 220a can include application settings, files, and data specific to the associated user of the client device 110. The client device 110 may be used by a user to perform cryptocurrency transactions or request other services offered by the web application, such as via a graphical user interface (GUI) screen rendered on the client device 110. For example, client device 110 may be coupled to at least one input device 230a and output device 232 accessible by the user (e.g., for user input and output perceivable by the user). Input device 230a can include a mouse, keyboard, a pointer, a stylus, a touch-screen display, microphone, voice recognition software, graphical user interface (GUI), and/or the like. The output device 232 can include a display (e.g., the same touchscreen display as the input device), a speaker, an alarm, and the like.

Although the above description describes certain functions being performed by processor 205a of the client device 110 and other certain functions being performed by processor 205b of the server 130 (hereinafter, collectively referred to as "processors 205"), all of the functions described herein can be performed by client device 110 and/or server 130 in some other alternative division of labor. That is, processors 205 could perform more or less of the functions described above. In some embodiments, some or part of client device 110 can be co-located with the server 130. That is, the server 130 can be remote from or both the client device 110 and the server 130 can be part of the same larger computing system, network, or architecture.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
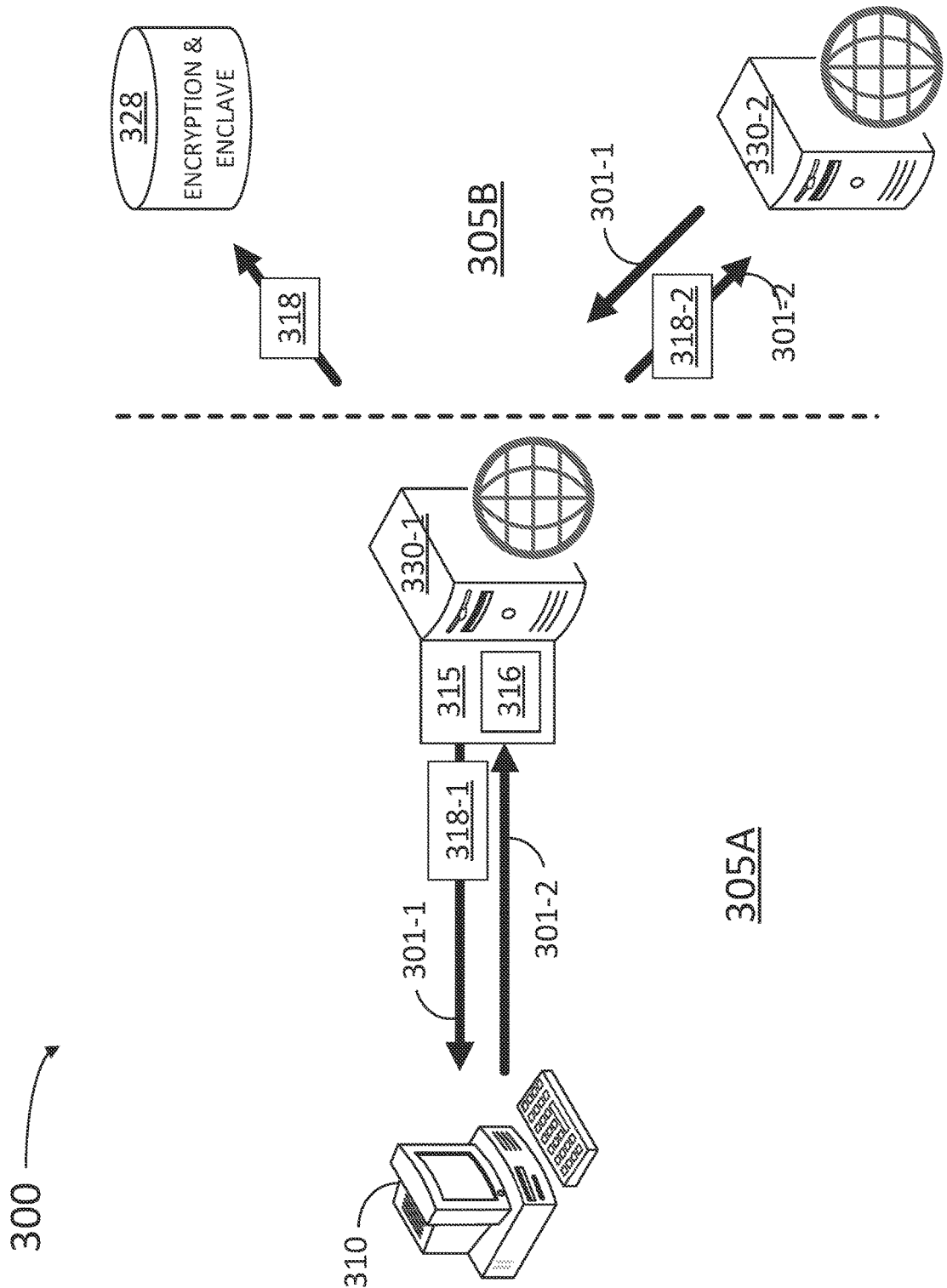
FIG. 3 is a schematic illustration of application requests to a network server in a trusted and secured application execution environment, according to some embodiments.

FIG. 3 is a schematic illustration of a trusted execution environment 300, according to some embodiments. Environment 300 includes application requests 301-1 and 301-2 (hereinafter, collectively referred to as "API requests 301") to a network server 330-1 from a client device 310 in a front-end 305A. Client device 310 may be a mobile device in the hands of a user running a network application, or an administrator/operator in a resource node or a remote platform servicing the application, in the network. Network server 330-1 is configured to handle trusted execution environment 300 for multiple application services. Accordingly, network server 330-1 routes requests 301 to a specified enclave server 330-2 in a backend 305B, based on application requests 301. Enclave server 330-2 hosts the specific application to service requests 301. Enclave server 330-2 may provide services including encrypted communication, such as executing a cryptocurrency order for a buy or sell transaction. Network server 330-1 and enclave server 330-2 will be collectively referred to, hereinafter, as "servers 330."

API requests 301 may include a request 301-1 to receive data and/or information in client device 310 from an external resource or service running on server 330 (e.g., GET). Request 301-1 may involve only guaranteeing to client device 310 that the response is authentically being received from enclave server 330-2. Accordingly, request 301-1 may not be encrypted when forwarded to enclave server 330-2. For example, the response can be authenticated via a hash-based message authentication code (HMAC) signature from the validated application enclave, such as based on a cryptographic signature, token, hash, or secret key 318-1. Secret key 318-1 can be shared by the client device 310 and server 330-1. When authenticated, server 330-1 forwards request 301-1 to enclave server 330-2, without encryption. Moreover, in some embodiments, secret key 318-1 may be used to establish trust for scaling, or for shifting responsibility for terminating the TLS connections of client device 310.

API request 301-2 may include sensitive (e.g., confidential) data from client device 310 to enclave server 330-2 (e.g., POST, PUT). As an example, POST or PUT requests may send sensitive data to server 330-1 from client device 310 to create or update resources. Accordingly, API request 301-2 may be encrypted by network server 330-1 with an encryption key 318-2, prior to being received by enclave server 330-2, to hide any sensitive information (e.g., a cryptocurrency order) from components of environment 300 outside of enclave server 330-2. Other requests 301 may include commands such as HEAD-to print or display a string of a pre-selected size at the head of a file-, DELETE-to remove a portion of a file-, PATCH-to apply editing instructions to a file-, OPTIONS-to list options or parameter values in a given command-, CONNECT-to connect to enclave server 330-2-, TRACE-to determine the travel time of a data packet between client device 310 and enclave server 330-2-, and the like. Encryption key 318-2 may be a shared secret between a specific load balancer in server 330-1 and enclave server 330-2. Accordingly, no other actor or operator in environment 300 may have access to the confidential information prior to execution/handling of API request 301-2 by enclave server 330-2. Encryption keys 318-1 and 318-2 will be collectively referred to as "encryption keys 318" and stored in database 328.

Each of requests 301 may have different sensitivity levels for privacy and security which are assessed by sensitivity level module 316. For example, a CONNECT request 301 to create a secure connection to enclave server 330-2 may include a sensitivity level that is less robust than a POST or PUT request 301-2. In such case, network server 330-1 may encrypt request 301 using an encryption key 318 that is less stringent than encryption key 318-2 (e.g., a lower bit count), and more robust than encryption key 318-1 (e.g., a higher bit count).

In general, API requests 301 such as HEAD, OPTIONS, CONNECT, TRACE are used for managing/viewing the HTTP connection settings/options (though they may be rarely used). API requests 301 such as GET, POST, PUT, DELETE, PATCH could be used with varying sensitivity levels. Accordingly, the sensitivity level is not necessarily tied to the HTTP method. For instance, a GET request to view public information (e.g., the latest BTC/USD price, the current server time, and the like), may be associated with a low sensitivity level. However, a GET request to view confidential information (e.g., my accounts balances/trade history, and the like) may be associated with a high sensitivity level. Enclave server 330-2 would know the sensitivity level of a request based on both the HTTP method and URL path. For instance, "GET/prices" may be low sensitivity but "GET/account/balances" may be high sensitivity.

Network server 330-1 provides a multi-service environment 300 having enhanced data security and high computational efficiency. For example, encryption key 318-2 only allows access to request 301-2 (e.g., requesting a cryptocurrency transaction) to enclave server 330-2. Moreover, networking in the backend 305B between load balancers and different enclave servers 330-2 can be performed externally to each one of enclave servers 330-2. This lowers processing cost and time for enclave server 330-2 to handle request 301-2, since the networking overhead is carried through by network server 330-1. Accordingly, enclave server 330-2 uses encryption only when desired, and with different levels of complexity as determined by sensitivity level module 316 in API layer 315. This graded security complexity reduces computational processing and encryption costs. Thus, sensitivity level module 316 facilitates horizontal scaling execution of environment 300 based on the services supported by enclave server 330-2.

Figure 4:
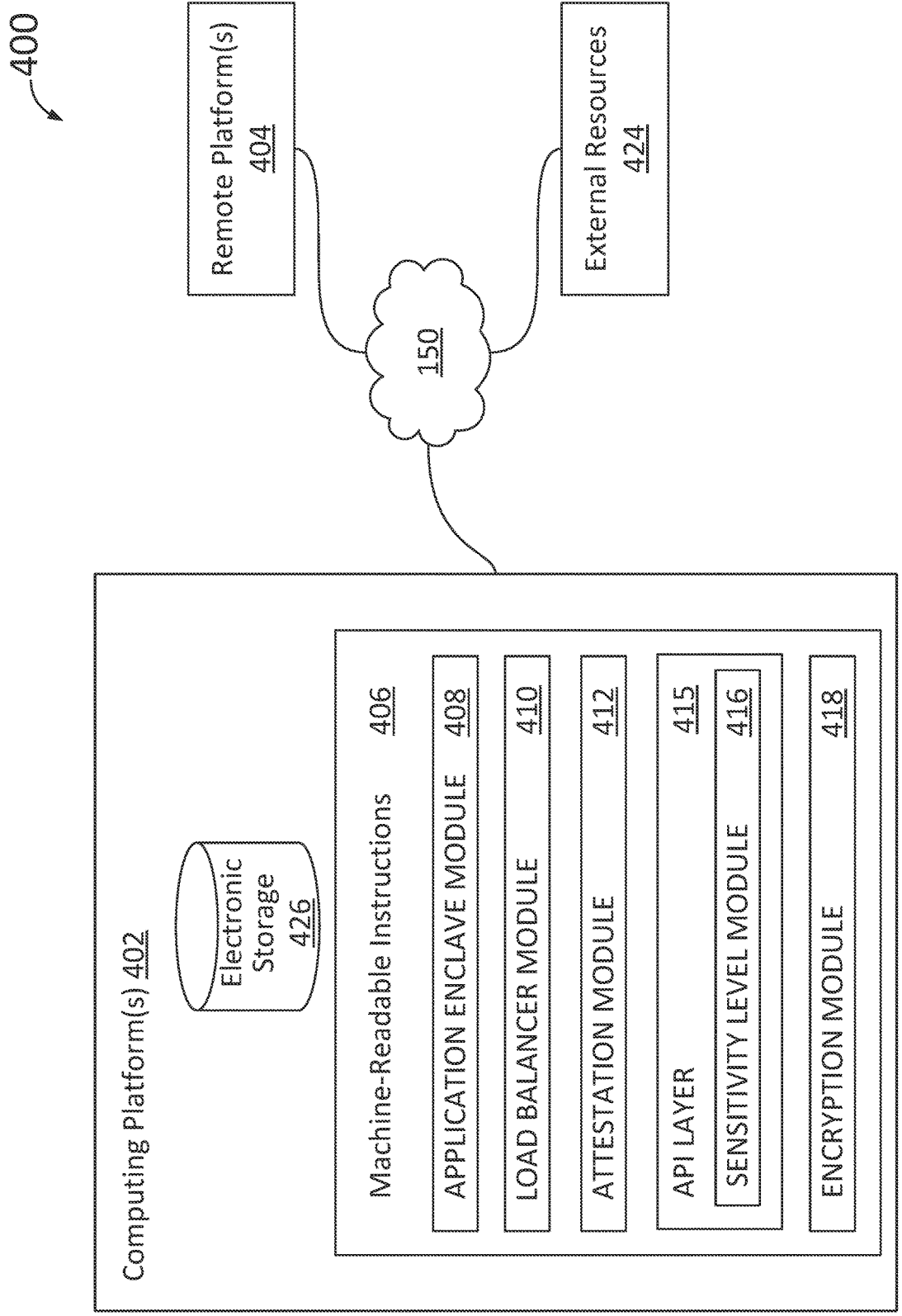
FIG. 4 is a block diagram illustrating an example computer system with which aspects of the subject technology can be implemented.

FIG. 4 is a block diagram illustrating an example computer system 400 with which aspects of the subject technology can be implemented. System 400 may be configured for providing a scaled trusted execution environment, according to certain aspects of the disclosure. In some implementations, the system 400 may include one or more computing platforms 402. The computing platform(s) 402 can correspond to a server component of a trusted execution environment platform as disclosed herein (cf. server(s) 130 and client(s) 110). Computing platform(s) 402 can be configured to provide a horizontal scaling architecture for trusted execution environment-based web services for providing services (e.g., microservices, web2 services, web4 services, etc.) in response to requests (e.g., public API requests from the remote platform(s) 404), such as services for blockchain or cryptocurrency accounts. In particular, computing platform(s) 402 can provide security guarantees applied with a varying level of security depending on the sensitivity level of requests being received and routed to application enclaves for handling/execution of data and code in a secured isolated portion of computer memory.

The computing platform(s) 402 may be configured to communicate with one or more remote platforms 404 according to a client/server architecture, a peer-to-peer architecture, and/or other architectures. The remote platform(s) 404 may be configured to communicate with other remote platforms via computing platform(s) 402 and/or according to a client/server architecture, a peer-to-peer architecture, and/or other architectures. Because non-scaled trusted execution environments may handle only a limited quantity of requests, the horizontally scaled trusted execution environment computing platform(s) 402 may address this limitation by providing more throughput to handle a more significant quantity of requests. That is, the system 400 may provide a networking solution for providing web services or microservices in enclave execution environments. In this way, the remote platform(s) 404 can interact with the computing platform(s) 402 to request and receive Internet-based services. As an example, client devices of the remote platform(s) 404 can send API requests requiring varying levels of security and the computing platform(s) can provide the security, confidentiality and tamper-proof guarantees necessary for trusted execution of the API requests according to their corresponding security or sensitivity levels. The client devices of the remote platform(s) 404 may select various enclave encryption load balancers from a DNS record for the web services being provided, which can maintain a distributed load across the load balancers. The DNS record naming a set of enclave encryption load balancers may be stored in storage of the external resources 424. The computing platform(s) 402, external resources 424, and remote platform(s) 404 may be in communication and/or mutually accessible via the network 150.

The computing platform(s) 402 may be configured by machine-readable instructions 406. The machine-readable instructions 406 may be executed by the computing platform(s) to implement one or more instruction modules. The instruction modules may include computer program modules. The instruction modules being implemented may include one or more of application enclave module 408, load balancer module 410, attestation module 412, API layer 415 including sensitivity level module 416, encryption module 418, and/or other instruction modules.

The application enclave module 408 can implement a trusted enclave environment such as a secure application enclave for data and/or computer code being transported or executed for web services being delivered. As used herein, the web services may include a user interface and backend services such as executing orders (e.g., payments and transactions), maintaining inventory or accounts, checking user or transaction data (e.g., related to cryptocurrency accounts), consensus, smart contracts, cryptographic information storage, and/or the like. The application enclaves may constitute trusted environments as central processing unit (CPU) isolated private enclaves existing in a portion of memory of the computing platform(s) 402. When sensitive data or code is inside a particular enclave (or being executed or handled), such data or code is not accessible. That is, the contents of application enclaves implemented by the application enclave module 408 are not removable, modifiable, or otherwise accessible to external actors. In this way, the application enclave module 408 may provide code confidentiality and authentication.

For example, the application enclave module 408 and the attestation module 412 can perform attestation, which can be remote. As an example, a remote party may receive cryptographic proof that a particular application enclave of the application enclave module 408 that the remote party is communicating with is a valid enclave signed by a specific identity running a specific version of its source code. In this way, the application enclaves of the application enclave module 408 can be attested or verified as proof that application enclaves are valid enclaves running the specific version. This link of trust can be based on a shared cryptographic secret via the attestation. For example, the result of remote attestation can be generation of the shared secret that only a requesting party of the remote platform(s) 404 and the application enclave in communication with the requesting party is aware of. This can enable the requesting party and the application enclave to use the shared secret to encrypt further messages or communication. As an example, the shared secret can be generated via a Diffie-Hellman key exchange. The cryptographic keys can be stored securely in the electronic storage 426 and memory of the remote platform(s) 404, respectively.

Application enclave module 408 may initialize each of the application enclaves as backend components of a web application configured for providing the web services. Such initialized application enclaves may be inaccessible to the public; rather, they may be accessible only to load balancer hosts of the load balancer module 410. The initialized application enclaves may be configured to handle data/requests or execute instructions for public requests for specific web services from various client devices of the remote platform(s) 404. Advantageously, only the selected application enclave of the initialized application enclaves for each public request may be able to access confidential information indicated or associated with the corresponding public request. For example, only the selected application enclave executing a cryptocurrency transaction may access the otherwise encrypted/confidential order information for the transaction. The application enclaves of the application enclave module 408 can be used to securely provide the web services, such as for order matching execution order logic of the web application being used for cryptocurrency trading of a given workbook pair. For example, the application enclaves can be contest managers or manage other types of web services offered online by the web application.

The load balancer module 410 may route requests to various application enclaves of the application enclave module 408 based on sensitivity levels of public requests, which can be indicated by the sensitivity level module 416. The load balancers of the load balancer module 410 can be managed by the web application or an application of the scaled trusted execution environment of the system 400. The load balancer application can function as a thin layer that handles public requests from the various client devices of the remote platform(s) 404. The load balancer application can be a stateless application such that it can be scaled horizontally. That is, the load balancer layer can have multiple applications, components, and/or load balancers with encryption keys for encrypting information to forward onto the corresponding application enclave, rather than reading to or writing from a database. The application may facilitate a DNS record from the external resource 424 that names a set of various enclave encryption load balancers for selection by the various client devices, which can help maintain a roughly fair distribution of load across the various enclave encryption load balancers. As described herein, the load balancer module 410 may also implement a pass-through load balancer at a fixed IP address connecting to a routing layer in front of the application enclaves controlled by the application enclave module 408.

The load balancers route the public requests to attested backend application enclaves of the application enclave module 408 according to the load on the application enclaves so as not to overburden instances of the application enclaves. As an example, the client devices send the public requests to an API of the load balancer application over an SSL connection that terminates within the load balancer enclaves of the enclave encryption load balancers/load balancer application. In this way, confidentiality of the public requests according to associated sensitivity levels can be improved. The load balancer enclaves can validate and sanitize the public requests being received. The load balancer enclaves can determine which backend application enclaves that the enclave encryption load balancers should route or forward the public requests to. This routing can be based on the respective sensitivity levels of the public requests. As an example, the load balancer enclaves can encrypt sensitive request information of the public requests according to the respective sensitivity levels using a shared secret from the electronic storage 426 shared with the respective destination backend application enclave of the application enclave module 408.

After encryption via the shared secret, the load balancer enclaves may send the encrypted public requests externally to the load balancer enclaves for forwarding to a back application server. For example, untrusted code outside of the trusted execution environment may forward the encrypted request information by the load balancer enclaves to a particular backend application server (e.g., networked virtual machine) that manages a particular application enclave of the application enclave module 408. After execution or handling of the encrypted request (e.g., including decryption by the particular application enclave via the shared secret), the resulting response from the particular application enclave is forwarded by the particular backend application server to be returned to the routing load balancer, which can validate the resulting response as authentic and return it to the client device of the remote platform(s) 404 which initially generated the request. The load balancers and other components of the load balancer module 410 can advantageously determine which requests need to go through which application enclaves at what level of encryption, which can improve computational efficiency and use of resources for operation of the web application and the horizontally scaled trusted execution environment. That is, the application enclaves can perform the minimum operations necessary to achieve the scaled trusted environment.

Attestation module 412 may be used to perform attestation and/or generate attestation reports. As an example, the client devices of the remote platform(s) 404 may perform attestation of the load balancer enclaves and/or application. The client device performed attestation can cause generation of attestation reports that indicate a response from the corresponding load balancer enclave received for each backend application enclave that the client device is connected to. Moreover, the attestation report from the client device can include proof that the corresponding application enclave does securely hold the associated SSL key (e.g., in the electronic storage 426) for the certificate used for the client's API (e.g., HTTPS API). This may enable the client device to validate that the scaled trusted encryption environment is functioning properly. The attestation module 412 can also be used so that the load balancers of the load balancer module 410 may attest to the application enclaves of the application enclave module 408 which are located "behind" the load balancers relative to the web application. The attestation performed by the attestation module 412 may also be remote attestation to establish trust between applications so that the TLS connection for the client devices of the remote platform(s) 404 can be terminated ahead of the application enclaves of the application enclave module 408 in a secure routing/networking layer, which may improve the computational scalability, efficiency, and/or processing capability of the scaled trusted execution environment.

Attestation module 412 obtains shared cryptographic secrets for encrypting messages, data, and/or requests forwarded by load balancer module 410. Attestation module 412 facilitates and stores results of performance of attestation by the load balancers of each backend application enclave. Attestation module 412 generates resulting cryptographic secrets that can be stored in the electronic storage 426. The resulted cryptographic secrets can be shared between the load balancers and application enclaves and can be used to encrypt and authenticate any future requests from the load balancer module 410 and application enclave machine layers of the application. Attestation module 412 can also facilitate attestation of load balancer enclaves by the application enclaves. In such a scenario, the backend application servers for the application enclaves can defer certain checks such as data sanitization to the load balancer nodes.

Sensitivity level module 416 can define sensitivity levels for each type of request to API layer 415 to provide a correct level of security guarantee within the scaled trusted execution environment. Sensitivity level module 416 determines whether a particular API request should be visible to a server operator for the application or should be encrypted.

As discussed herein, encryption module 418 can encrypt and provide an appropriate level of confidentiality depending on what requests are generated and services are requested by client devices of the remote platform(s) 404. The varying level of encryption can be based on varying techniques in symmetric cryptography, hashing, security or access tokens, asymmetric cryptography, or other cryptographic methods, which can be applied according to the defined sensitivity level. Encryption module 418 can determine what level and how robust cryptographic keys, shared secrets, hash functions, encryption algorithms, and/or digital signatures being used should be. Encryption module 418 can provide security guarantees that during processing on the backend of the web application, no actors or components will have access to confidential or sensitive information. For example, encryption module 418 can cause correct execution of cryptocurrency transactions on a blockchain based exchange without anyone having access to the cryptographic keys, funds, or other personal sensitive information of a user of a client device being used for services of the web application. For example, encryption module 418 and application enclave module 408 can be used to implement a trustless exchange such that a server operator or other actor involved with the computing platform(s) 402 cannot have access to data or code in application enclaves.

In some implementations, computing platform(s) 402, remote platform(s) 404, and/or external resources 424 may be operatively linked via one or more electronic communication links. For example, such electronic communication links may be established, at least in part, via network 150 such as the Internet and/or other networks. It will be appreciated that this is not intended to be limiting, and that the scope of this disclosure includes implementations in which computing platform(s) 402, remote platform(s) 404, and/or external resources 424 may be operatively linked via some other communication media.

A given remote platform 404 may include client computing devices, which may each include one or more processors configured to execute computer program modules. Computer program modules may be configured to enable an expert or user associated with the given remote platform 404 to interface with system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms. External resources 424 may include sources of information outside of system 400, external entities participating with system 400, and/or other resources. For example, external resources 424 may include externally designed blockchain elements and/or applications designed by third parties. In some implementations, some or all of the functionality attributed herein to external resources 424 may be provided by resources included in system 400.

Computing platform(s) 402 may include electronic storage 426, a processor (cf. processors 205), and/or other components. Computing platform(s) 402 may include communication lines, or ports to enable the exchange of information with a network and/or other computing platforms. Illustration of computing platform(s) 402 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 426 may include non-transitory storage media that electronically stores information. The electronic storage media of electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, and the like) or a drive (e.g., a disk drive, etc.). The electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, cryptographic information, information determined by processor(s) 205a-205b, information received from computing platform(s) 402, information received from remote platform(s) 404, and/or other information that enables the computing platform(s) 402 to function as described herein.

The processors may be configured to provide information processing capabilities in the computing platform(s) 402. As such, processor(s) 205a-205b may include one or more of a digital processor, an analog processor, a digital circuit designed to process information, an analog circuit designed to process information, a state machine, and/or other mechanisms for electronically processing information. Although processor(s) 205a-205b is shown in FIG. 1 as a single entity, this is for illustrative purposes only. In some implementations, the processors may include a plurality of processing units. These processing units may be physically located within the same device, or processor(s) 205a-205b may represent processing functionality of a plurality of devices operating in coordination. The processors may be configured to execute modules 408, 410, 412, 416, 418, and/or other modules by software; hardware; firmware; some combination of software, hardware, and/or firmware; and/or other mechanisms for configuring processing capabilities on the processor(s) 205a-205b. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 408, 410, 412, 416, and/or 418 are illustrated as being implemented within a single processing unit, in implementations in which the processors include multiple processing units, one or more of modules 408, 410, 412, 416, and/or 418 may be implemented remotely from the other modules. The description of the functionality provided by different modules 408, 410, 412, 416, and/or 418 described herein is for illustrative purposes, and is not intended to be limiting, as any of the modules 408, 410, 412, 416, and/or 418 may provide more or less functionality than described. For example, one or more of modules 408, 410, 412, 416, and/or 418 may be eliminated, and some or all of its functionality may be provided by other ones of modules 408, 410, 412, 416, and/or 418. As another example, processor(s) 205a-205b may be configured to execute one or more additional modules that may perform some or all of the functionality attributed below to one of modules 408, 410, 412, 416, and/or 418.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
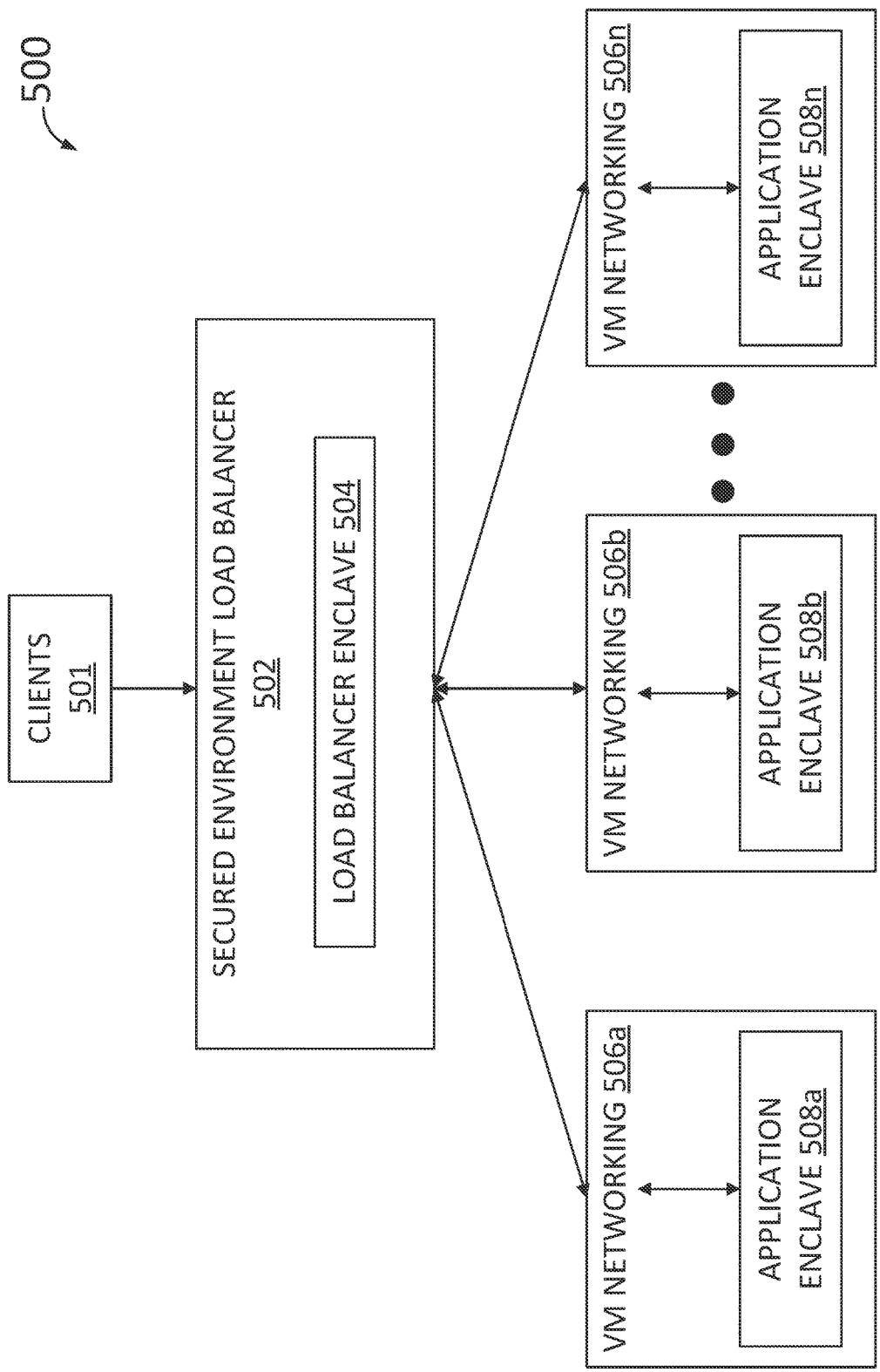
FIG. 5 is a block diagram illustrating an example application in a trusted execution environment, according to certain aspects of the present disclosure.

FIG. 5 is a block diagram illustrating an example application trusted execution environment 500, according to certain aspects of the present disclosure. The application trusted execution environment 500 can include client devices 501, at least one secured environment load balancer 502, and networked virtual machines (VMs) 506a-506n comprising respective application enclaves 508a-508n. The at least one secured environment load balancer 502 can include a load balancer enclave 504. Although only one load balancer 502 is shown, there may be more than one load balancer 502, such as depending on the extent of scaling necessary to handle requests from the client devices 501. The secured environment load balancer 502 may be a stateless application, which enables it to scale horizontally according to the load represented by the quantity of public requests, such that the load of requests from the client devices 501 may be evenly distributed across the secured environment load balancers 502 and forwarded to networked VMs 506a-506n including application enclaves 508a-508n, where n can be any integer greater than 2. The number of VMs, n, may be as high as desired, depending on the extent of scaling desired to handle forwarded requests from client devices 501 and load balancers 502.

The requests can be public API requests for services provided by a web application that implements the application trusted execution environment 500. For example, the API requests from the client device 501 may be sent to (e.g., received by) the load balance enclave component 504 of the one secured environment load balancer 502 via SSL end-to-end encryption such that the SSL connection for the API requests can terminate at the load balance enclave component 504. Prior to sending the requests, the client device 501 may perform attestation of the load balancer enclave component 504 and the secured environment load balancer(s) 502 and the application enclaves 508a-508n may perform attestation of each other, such as for generating a shared secret for encryption. For each request from each sending client device 501, the load balancer enclave component 504 may route or forward each request to an application enclave 508a-508n with a level of encryption corresponding to the level of confidentiality/sensitivity that is required for each request.

As an example, the load balance enclave component 504 may re-encrypt an API request from a particular client device 501 that included confidential information such as cryptocurrency order information for a new order API request to the web application of the application trusted execution environment 500. That is, the original SSL encryption that terminated at the load balancer enclave component 504 would cause the confidential order information to be visible to the load balancer enclave component 504 which can re-encrypt the confidential order information with the shared secret (e.g., shared cryptographic secret key such as HMAC secret key) that is shared with the particular VM and application enclave of the VMs 506a-506n and the application enclaves 508a-508n. By using the shared secret to encrypt, the load balancer enclave component 504 can function as an enclave server and route the re-encrypted new order API request (e.g., via the sensitivity level of the new order API request) from the secured environment load balancer 502 to the selected particular application enclave.

The re-encrypted request can be forwarded by the load balancer enclave server 504 via an untrusted networking layer (e.g., as distinguished by the trusted execution environment of application/memory enclaves). Because the re-encryption is a symmetric encryption, the particular application enclave can decrypt the re-encryption using the shared secret and handle the new order API request. Other types of API requests from the particular client device 501 can be encrypted differently or not encrypted at all according to the confidentiality and sensitivity of the particular type of API request as indicated by the corresponding sensitivity level. As an example, a type of non-confidential API request for retrieving order information for the client devices 501 for a specific time, such as yesterday or some other past time. As an example, authentication, partial cryptography, or other security guarantees can be provided if the body of the non-confidential API request is not encrypted. For example, the particular application enclave can provide an HMAC on a response body in response to the non-confidential API request as assurance (e.g., to the particular client device 501) that no untrusted party tampered with the result of the non-confidential API request. Such an HMAC may prevent tampering or unauthorized modification of the results even if the result may be visible.

In this way, the load balancer enclave server 504 can apply a corresponding type of re-encryption or no encryption (e.g., mere authentication of application enclave response rather than encryption of API requests). The load balancer enclave server 504 may validate and sanitize the API request from the particular client device 501 and determines which of the application enclaves 508a-508n that the particular type of API request should be forwarded to. The routing by the secure environment load balancer 502 and/or load balancer enclave server 504 can be based on the level of encryption or security necessary for the given type of API request. For example, the sensitivity level of the given type of API request can be used to determine which of the application enclaves 508a-508n that the given type of API request should be routed to. The sensitivity level can be determined by the operator of the application trusted execution environment 500 or may be received as input from the particular client device 501. For example, the particular client device 501 may send sensitivity level information in a configuration file with API requests for the secure environment load balancer 502 and/or load balancer enclave server 504 to determine the sensitivity level.

Alternatively, the load balancer enclave server 504 can function as any suitable type of load balancing mechanism. For example, the load balancer enclave server 504 may function as a single load balancer application at a fixed IP address that acts as a pass through to a routing/networking enclave layer (e.g., comprising multiple routing/networking enclaves). In such an implementation, the secure environment load balancer 502 could instead operate outside of a secure enclave considering that it would not terminate the TLS connection of the particular client device 501 to the routing/networking enclave layer. The pass through load balancer 502 could merely function as an entry for forwarding connections to the routing/networking enclave layer. Since the pass-through load balancer 502 functions as a single application at a fixed IP address, this configuration could beneficially prevent the particular client device 501 from spamming a single routing enclave instance by using the same IP address and bypassing the DNS round-robin resolution. Accordingly, the efficiency and throughput of the load balancing mechanism and/or application trusted execution environment 500 can be improved.

The pass-through load balancer 502 may perform a plurality of functions such as rate limiting and round-robin routing to the routing/networking enclaves of the routing/networking enclave layer. Such rate limiting may occur externally to secure enclaves, since the TLS connection termination (and corresponding visibility of public API requests from the particular client device 501) does not occur until requests reach the routing/networking enclaves (e.g., routed to a particular routing/networking enclave). Once the public API requests are routed to a corresponding particular routing/networking enclave, the corresponding enclave can terminate the TLS connection. The corresponding routing/networking enclave can also parse and route requests to the application enclaves 508a-508n (e.g., particular corresponding instances of the application enclaves 508a-508n). In this configuration, the corresponding application enclaves 508a-508n that the public requests to the API layer are routed to receive the request(s) from the corresponding routing/networking enclave and handle corresponding application logic.

Regardless of which suitable load balancer mechanism is implemented, load balancer 502 may consider a quantity of applications in the application enclaves 508a-508n behind load balancer 502 to determine which of the application enclaves 508a-508n to route which API request to. For example, various application enclaves 508a-508n may perform different roles, such as the application enclave 508a may be an order book for cryptocurrency while application enclave 508b may be a platform for a different cryptocurrency exchange. Instances of the application enclaves 508a-508n can also be arbitrarily generalized applications that handle a specific type of request from the particular client device 501. As such, the secure environment load balancer 502 and/or load balancer enclave server 504 can route requests to the API layer based on their corresponding request type. For example, specific application enclaves 508a-508n can support specific types of order books. As an example, the secure environment load balancer 502 and/or load balancer enclave server 504 can route requests to the API layer for particular currency pairs according to which of the application enclaves 508a-508n handles or supports order books corresponding to the particular currency pairs.

In this way, load traffic can be distributed more evenly across the application enclaves 508a-508n which beneficially can facilitate implementation of the horizontally scaled application trusted execution environment 500 for dividing request traffic while maintaining the trusted execution environment security necessary for various requests. As discussed herein, the scaled secure computing of the application trusted execution environment 500 may advantageously prevent undesirable actions by malicious actors, such as front loading by malicious actors to execute a same cryptocurrency sale before a request to the API layer for a sell order that has been matched/executed. The horizontally scaled application trusted execution environment 500 may be part of any web application that requires scaled secure computing in a networked environment. In particular, the horizontally scaled application trusted execution environment 500 can be useful for microservices architectures to provide application enclave execution to safeguard against operators of the microservices architectures for cryptocurrency exchanges and/or order matching from front running cryptocurrency orders received via requests to the API layer.

Thus, in the application trusted execution environment 500, security guarantees can be provided to the user of the particular client device 501 that a request to the API layer for cryptocurrency order execution is executed correctly without unauthorized access to the user's cryptocurrency funds or confidential/sensitive information. The security guarantees can be based on encryption of confidential information when it is passed externally to a valid application enclave running a specific source code version and verification/authentication that the valid application enclave is operating correctly. Attestation can provide cryptographic proof of communication with the valid application enclave running the specific source code version, such as via remote attestation which results in a shared cryptographic secret for encrypting future messages (e.g., Diffie-Hellman key exchange).

Figure 6:
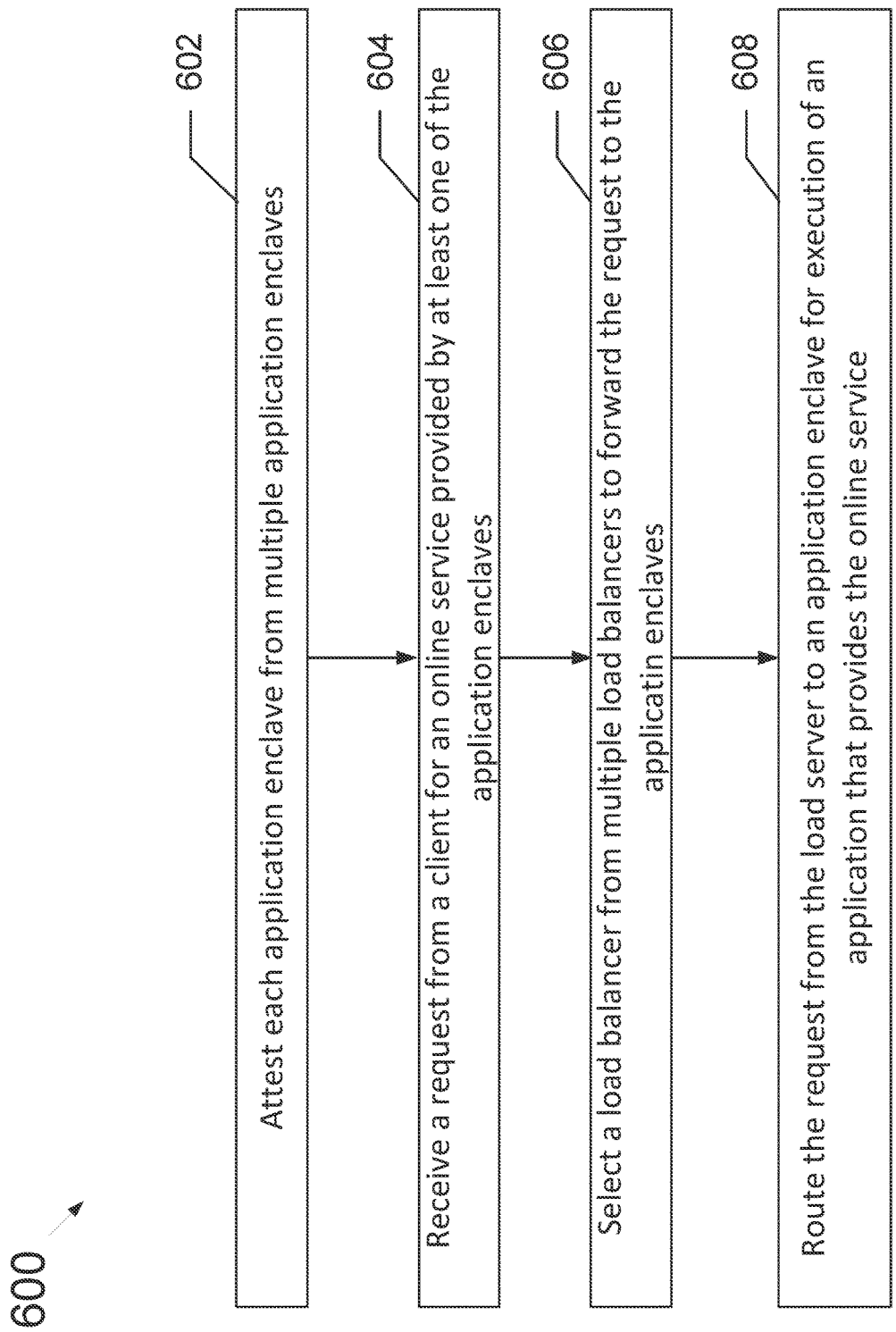
FIG. 6 is a flow chart illustrating steps in a method for providing a trusted execution environment for multiple application services, according to certain aspects of the present disclosure.

FIG. 6 illustrates an example flow diagram (e.g., process 600) for providing an application trusted execution environment such as via a computing platform, according to certain aspects of the disclosure. For explanatory purposes, the example process 600 is described herein with reference to one or more of the figures above. Further for explanatory purposes, the blocks of the example process 600 are described herein as occurring in serial, or linearly. However, multiple instances of the example process 600 may occur in parallel, overlapping in time, almost simultaneously, or in a different order from the order illustrated in the process 600. In addition, the blocks of the example process 600 need not be performed in the order shown and/or one or more of the blocks of the example process 600 need not be performed.

At step 602, attestation of each application enclave of a plurality of application enclaves for a plurality of applications may be performed. According to an aspect, performing the attestation of each application enclave comprises determining, by the load balancer and for each application enclave, cryptographic information comprising at least one of: a shared cryptographic key, a cryptographic credential, or a hash authentication of an application configured to be executed by the plurality of application enclaves. According to an aspect, performing the attestation of each application enclave comprises verifying, based on the cryptographic information, a validity or authenticity of each of the application enclaves. At step 604, a request may be received from a client. According to an aspect, receiving the request comprises receiving a type of API request corresponding to the request.

At step 606, a load balancer of a plurality of load balancers to forward the request to the plurality of application enclaves may be selected. According to an aspect, selecting the load balancer comprises initializing each of the plurality of load balancers as a stateless application. According to an aspect, selecting the load balancer comprises determining the plurality of load balancers based on a domain name system (DNS) record. At step 608, the request from the load balancer may be routed by an enclave server of the load balancer to an application enclave of the plurality of application enclaves according to the sensitivity level for execution of an application of the plurality of applications in the application trusted execution environment. According to an aspect, routing the request from the load balancer to the application enclave comprises determining, based on the secured environment parameter, a visibility of client information associated with the request according to the sensitivity level of the request.

According to an aspect, the process 600 may further include performing, by the client, another attestation of the load balancer based on an attestation report. According to an aspect, the process 600 may further include performing user input sanitization by the load balancer. According to an aspect, the process 600 may further include encrypting, based on the sensitivity level and prior to sending the request to at least one of the plurality of application enclaves, information associated with the request via an encryption mechanism shared with the at least one of the plurality of application enclaves. According to an aspect, the process 600 may further include selecting the application enclave based on the sensitivity level or the application. According to an aspect, the process 600 may further include validating a response from the application enclave as authentic prior to returning the response to the client.

According to an aspect, the process 600 may further include determining, by the issuer of the non-transferable credential, an expiration time for the non-transferable credential. According to an aspect, the process 600 may further include determining, by the issuer of the non-transferable credential, performing a revocation of a key set of the non-transferable credential. According to an aspect, the process 600 may further include determining a sensitivity level of the request that is associated with a secured environment parameter. According to an aspect, determining the sensitivity level of the request comprises determining, based on the secured environment parameter, whether the request or information associated with the request requires encryption (e.g., depending on whether encryption is required).

Figure 7:
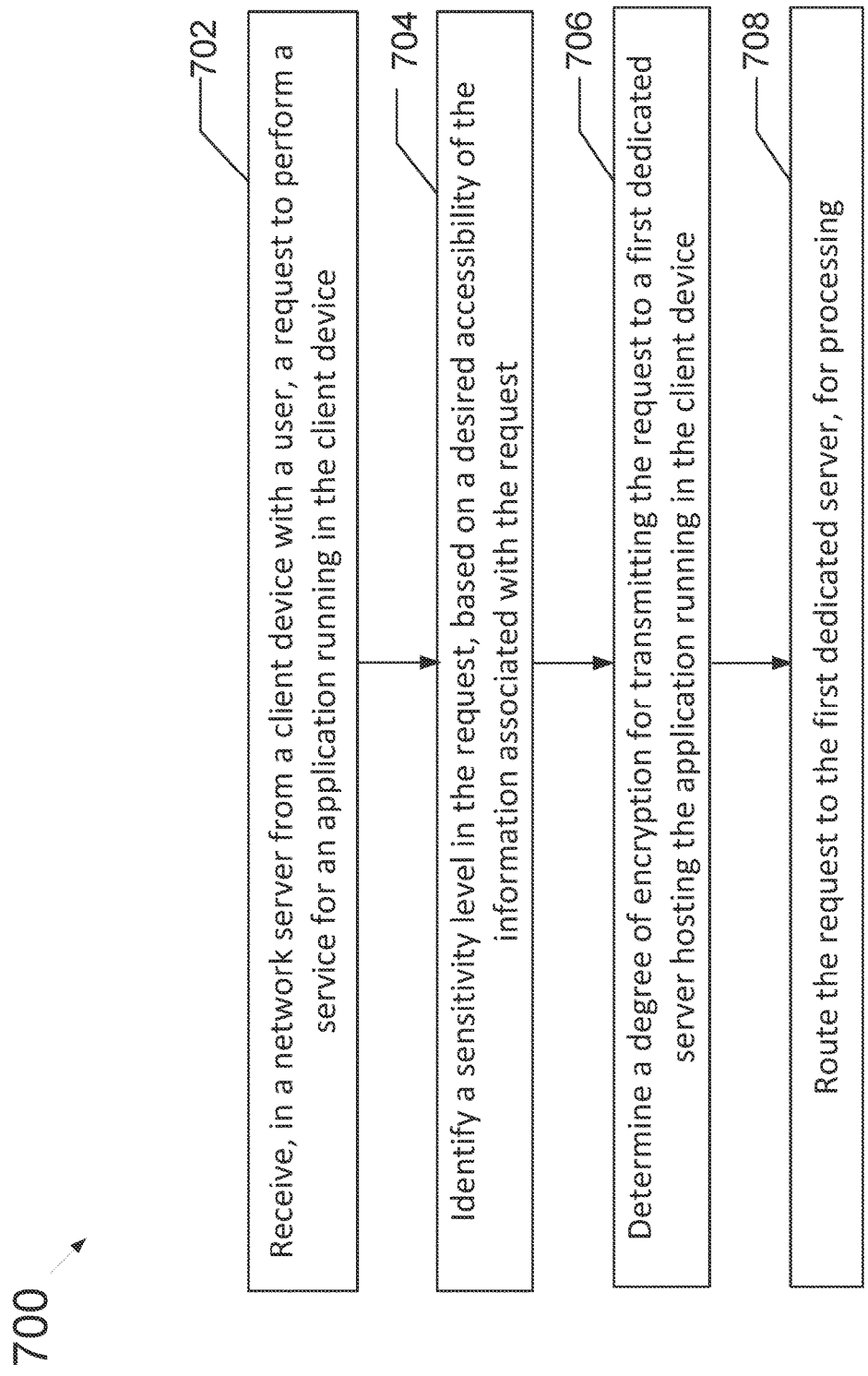
FIG. 7 is a flow chart illustrating steps in a method for identifying and assigning a sensitivity level to a service request from a user in a trusted execution environment, according to certain aspects of the present disclosure.

FIG. 7 is a flow chart illustrating steps in a method 700 for identifying and assigning a sensitivity level to a service request from a user in a trusted execution environment, according to certain aspects of the present disclosure. For explanatory purposes, method 700 is described herein with reference to one or more of the figures above. Further for explanatory purposes, the blocks of method 700 are described herein as occurring in serial, or linearly. However, multiple instances of method 700 may occur in parallel, overlapping in time, almost simultaneously, or in a different order from the order illustrated in method 700. In addition, the blocks of method 700 need not be performed in the order shown and/or one or more of the blocks of method 700 need not be performed.

Step 702 includes receiving in a network server from a client device with a user, a request to perform a service for an application running in the client device.

Step 704 includes identifying a sensitivity level in the request, based on a desired accessibility to a request information. In some embodiments, step 704 includes identifying one of a private information of the user, or a geolocation of the client device, and a privacy setting selected by the user in the application running in the client device. In some embodiments, step 704 includes receiving the sensitivity level from the client device.

Step 706 includes determining a degree of encryption for transmitting the request to a first dedicated server hosting the application running in the client device. In some embodiments, step 706 includes selecting a bit length of an encryption key. In some embodiments, step 706 includes encrypting the request based on the degree of encryption by generating an encryption key and providing the encryption key to the first dedicated server. In some embodiments, step 706 includes encrypting the request based on the degree of encryption and comprises using a shared secret between the network server and the first dedicated server.

Step 708 includes routing the request to the first dedicated server, for processing. In some embodiments, step 708 includes determining that a return time for a request response from the first dedicated server is less than a pre-selected threshold. In some embodiments, step 708 includes routing the request to a second dedicated server hosting the application running in the client device when a return time for a request response from the second dedicated server is lower than for the first dedicated server. In some embodiments, step 708 includes authenticating the client device using a shared secret between the client device and the network server. In some embodiments, step 708 includes returning a response to the request from the first dedicated server to the client device with the user.

Hardware Overview

Figure 8:
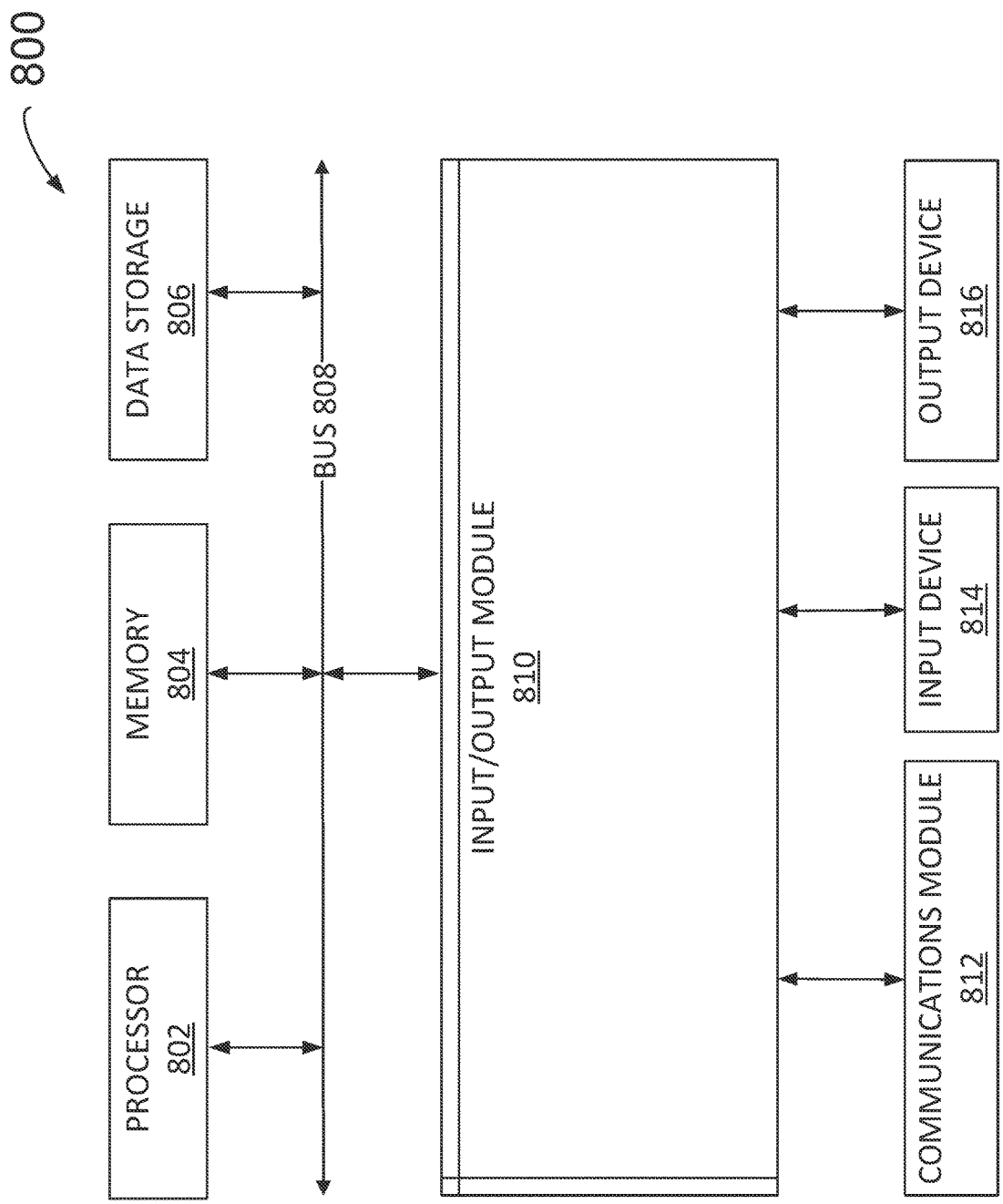
FIG. 8 is a block diagram illustrating an example computer system in which aspects of the present disclosure can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

The computer system 800 (e.g., server and/or client) includes a bus 808 or other communication mechanism for communicating information, and a processor 802 coupled with the bus 808 for processing information. By way of example, the computer system 800 may be implemented with one or more processors 802. Each of the one or more processors 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, and xml-based languages. Memory 804 may also be used for storing temporary variable or other intermediate information during execution of instructions to be executed by the processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 800 further includes a data storage device 806 such as a magnetic disk or optical disk, coupled to bus 808 for storing information and instructions. The computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as an LCD (liquid crystal display) monitor, for displaying information to the user.

According to one aspect of the present disclosure, the above-described systems can be implemented using a computer system 800 in response to the processor 802 executing one or more sequences of one or more instructions contained in the memory 804. Such instructions may be read into memory 804 from another machine-readable medium, such as data storage device 806. Execution of the sequences of instructions contained in the main memory 804 causes the processor 802 to perform the process steps described herein. One or more processors in a multi-processing arrangement may also be employed to execute the sequences of instructions contained in the memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. The computer system 800 can be, for example, and without limitation, a desktop computer, laptop computer, or tablet computer. The computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 802 for execution. Such a medium may take many forms, including, but not limited to, non-volatile media, volatile media, and transmission media. Non-volatile media include, for example, optical or magnetic disks, such as the data storage device 806. Volatile media include dynamic memory, such as the memory 804. Transmission media include coaxial cables, copper wire, and fiber optics, including the wires that comprise the bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for providing an application trusted execution environment, the method comprising:
    performing first attestation of a first application enclave from multiple application enclaves for a plurality of applications, to gain trust in executing the application enclaves for the plurality of applications;
    receiving a request from a client;
    selecting a first load balancer from multiple load balancers to forward the request to the application enclaves;
    encrypting, by the first load balancer, a request body of the request in an application layer, based on a type of the request;
    performing second attestation of the first load balancer based on an attestation report; and
    routing, by an enclave server of the load balancer, the request from the load balancer to an application enclave of the application enclaves for execution of an application of the plurality of applications in the application trusted execution environment.

2. The computer-implemented method of claim 1, wherein the request from the client includes to store a public data, further comprising assigning a sensitivity level to the request, storing the public data in a database, and enabling a server operator in the database to read and modify the public data.

3. The computer-implemented method of claim 1, wherein the request from the client includes an account balance, further comprising assigning a sensitivity level to the request, and storing the account balance in an encrypted Merkle trie accessible to an authorized application enclave.

4. The computer-implemented method of claim 1, wherein performing the attestation of a first application enclave comprises:
  determining, by the first load balancer and for each application enclave, cryptographic information comprising at least one of: a shared cryptographic key, a cryptographic credential, or a hash authentication of an application configured to be executed by the application enclaves; and
  verifying, based on the cryptographic information, a validity or authenticity of each of the application enclaves.

5. The computer-implemented method of claim 1, wherein receiving the request comprises receiving a type of an application layer request corresponding to the request.

6. The computer-implemented method of claim 1, wherein selecting the first load balancer comprises:
  initializing each of the load balancers as a stateless application; and determining the load balancers based on a domain name system (DNS) record.

7. The computer-implemented method of claim 1, further comprising determining a sensitivity level of the request based on a trusted environment parameter depending on whether the request or information associated with the request requires encryption.

8. The computer-implemented method of claim 6, wherein routing the request from the first load balancer to the first application enclave comprises determining, based on a trusted environment parameter, a visibility of client information associated with the request according to a sensitivity level of the request.

9. The computer-implemented method of claim 1, further comprising:
  encrypting the request body of the request in the application layer, based on corresponding shared cryptographic information with each of the application enclaves; and
  performing, by the first load balancer, user input sanitization.

10. The computer-implemented method of claim 1, further comprising:
  encrypting, based on a sensitivity level and prior to sending the request to at least one of the application enclaves, information associated with the request via an encryption mechanism shared with the at least one of the application enclaves;
  selecting the first application enclave based on the sensitivity level or a type of application; validating a response from the first application enclave as authentic; and
  encrypting the response prior to returning the response to the client.

11. A system for providing an application trusted execution environment, comprising: one or more processors; and
  a memory comprising instructions stored thereon, which when executed by the one or more processors, causes the one or more processors to perform:
    performing first attestation of each application enclave of a plurality of application enclaves for a plurality of applications;
    receiving a request from a client;
    selecting a load balancer of a plurality of load balancers to forward the request to the plurality of application enclaves;
    encrypting, by the load balancer, prior to sending the request to at least one of the plurality of application enclaves, information associated with the request via an encryption mechanism shared with the at least one of the plurality of application enclaves;
    performing second attestation of the load balancer based on an attestation report; and
    routing, by an enclave server, the request from the load balancer to an application enclave of the plurality of application enclaves for execution of an application of the plurality of applications in the application trusted execution environment.

12. The system of claim 11, wherein the instructions that cause the one or more processors to perform performing the attestation of each application enclave cause the one or more processors to determine, by the load balancer and for each application enclave, a shared cryptographic key to encrypt and authenticate requests from each application enclave.

13. The system of claim 11, wherein the one or more processors further execute instructions to verify that a hash authentication of an application configured to be executed by the plurality of application enclaves matches an expected version.

14. The system of claim 11, wherein the instructions that cause the one or more processors to perform receiving the request cause the one or more processors to perform receiving a type of application programming interface (API) request corresponding to the request.

15. The system of claim 11, further comprising stored sequences of instructions, which when executed by the one or more processors, cause the one or more processors to perform determining a sensitivity level of the request based on a trusted environment parameter, depending on whether the request or information associated with the request requires encryption.

16. The system of claim 11, wherein the instructions that cause the one or more processors to perform selecting the load balancer cause the one or more processors to perform:
  initializing each of the plurality of load balancers as a stateless application;
  determining the plurality of load balancers based on a domain name system record; and
  routing the request from the load balancer to the application enclave and determining, based on a trusted environment parameter, a visibility of client information associated with the request according to a sensitivity level of the request.

17. The system of claim 11, further comprising stored sequences of instructions, which when executed by the one or more processors, cause the one or more processors to perform encrypting, by the load balancer, a request body of a request to an application layer, based on corresponding shared cryptographic information with each of the plurality of application enclaves.

18. The system of claim 11, further comprising stored sequences of instructions, which when executed by the one or more processors, cause the one or more processors to perform:
  performing, by the load balancer, user input sanitization.

19. The system of claim 11, further comprising stored sequences of instructions, which when executed by the one or more processors, cause the one or more processors to perform:
  selecting the application enclave based on a sensitivity level or a type of application; and
  validating a response from the application enclave as authentic prior to returning the response to the client.

20. A non-transitory computer-readable storage medium comprising instructions stored thereon, which when executed by one or more processors, cause the one or more processors to perform operations for providing an application trusted execution environment, comprising:
- performing attestation of each application enclave of a plurality of application enclaves for a plurality of applications;
- receiving a request from a client;
- selecting a load balancer of a plurality of load balancers to forward the request to the plurality of application enclaves;
- encrypting, prior to sending the request to at least one of the plurality of application enclaves, information associated with the request via an encryption mechanism shared with the at least one of the plurality of application enclaves;
- selecting an application enclave of the plurality of application enclaves based on the application;
- encrypting, by the first load balancer, a request body of the request in an application layer, based on a type of the request;
- performing second attestation of the first load balancer based on an attestation report;
- routing, by an enclave server, the request from the load balancer to the application enclave for execution of an application of the plurality of applications in the application trusted execution environment; and
- validating a response from the application enclave as authentic prior to returning the response to the client.

* * * * *